US012469844B2

(12) United States Patent
Kang et al.

(10) Patent No.: US 12,469,844 B2
(45) Date of Patent: Nov. 11, 2025

(54) MULTI-LAYER COMPOSITE STRUCTURE CONTAINING PRE-LITHIATED METAL OXIDE AND METHOD FOR PREPARING THE SAME

(71) Applicant: KOREA UNIVERSITY RESEARCH AND BUSINESS FOUNDATION, Seoul (KR)

(72) Inventors: Yongmook Kang, Seoul (KR); Mihui Park, Seoul (KR); Seonyong Cho, Seoul (KR); Daniel Adjei Agyemang, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 238 days.

(21) Appl. No.: 17/508,645

(22) Filed: Oct. 22, 2021

(65) Prior Publication Data

US 2022/0131135 A1  Apr. 28, 2022

(30) Foreign Application Priority Data

Oct. 23, 2020 (KR) .................. 10-2020-0137955

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/485* (2013.01); *H01M 4/587* (2013.01); *H01M 2004/027* (2013.01); *H01M 10/0525* (2013.01)

(58) Field of Classification Search
CPC ...... H01M 4/366; H01M 4/485; H01M 4/587; H01M 10/0525; H01M 2004/027
See application file for complete search history.

(56) References Cited

U.S. PATENT DOCUMENTS

2014/0234715 A1\* 8/2014 Fasching ............... H01M 4/139
429/231.95
2015/0255802 A1\* 9/2015 Kim ...................... H01M 4/926
429/524
(Continued)

FOREIGN PATENT DOCUMENTS

JP         6137632 B2    5/2017
KR    10-0938058 B1     1/2010
(Continued)

OTHER PUBLICATIONS

Yang Jin et al., "Self-healing SEI enables full-cell cycling of a silicon-majority anode with a coulombic efficiency exceeding 99.9%," Energy & Environmental Science, Jan. 6, 2017, vol. 10, pp. 580-592.

(Continued)

*Primary Examiner* — Matthew T Martin
*Assistant Examiner* — Taylor Harrison Krone
(74) *Attorney, Agent, or Firm* — Hauptman Ham, LLP

(57) ABSTRACT

A multi-layer composite structure containing a pre-lithiated metal oxide includes a negative electrode particle, a first coating layer disposed on the negative electrode particle and containing a conductive carbon material, and a second coating layer disposed on the first coating layer and containing the pre-lithiated metal oxide formed through a lithiation reaction.

7 Claims, 15 Drawing Sheets

(51) Int. Cl.
    *H01M 4/485* (2010.01)
    *H01M 4/587* (2010.01)
    *H01M 10/0525* (2010.01)

(56) References Cited

U.S. PATENT DOCUMENTS

| | | | | |
|---|---|---|---|---|
| 2019/0157675 | A1* | 5/2019 | Kang | H01M 4/386 |
| 2021/0167369 | A1* | 6/2021 | Park | H01M 4/386 |
| 2021/0193993 | A1* | 6/2021 | Perera | H01M 4/366 |
| 2022/0037656 | A1* | 2/2022 | Park | H01M 4/1391 |

FOREIGN PATENT DOCUMENTS

| | | | | |
|---|---|---|---|---|
| KR | 10-2014-0081679 A | | 7/2014 | |
| KR | 10-1500565 B1 | | 3/2015 | |
| KR | 20150040141 A | * | 4/2015 | H01M 4/587 |
| KR | 10-1560892 B1 | | 10/2015 | |
| KR | 10-1571060 B1 | | 11/2015 | |
| KR | 20190119398 | * | 4/2018 | H01M 12/08 |
| KR | 10-1951637 B1 | | 2/2019 | |
| KR | 10-1960855 B1 | | 3/2019 | |
| KR | 10-2019-0052184 A | | 5/2019 | |
| KR | 10-2019-0079131 A | | 7/2019 | |
| KR | 10-2019-0114680 A | | 10/2019 | |
| KR | 10-2019-0119398 A | | 10/2019 | |
| KR | 10-2019-0139586 A | | 12/2019 | |
| KR | 10-2020-0023241 A | | 3/2020 | |
| KR | 10-2020-0108834 A | | 9/2020 | |
| KR | 10-2171499 B1 | | 10/2020 | |
| KR | 10-2021-0031563 A | | 3/2021 | |
| KR | 10-2021-0055137 A | | 5/2021 | |

OTHER PUBLICATIONS

Yanli Chen et al., "Hollow core-shell structured silicon@carbon nanoparticles embed in carbon nanofibers as binder-free anodes for lithium-ion batteries," Journal of Power Sources, 2017, vol. 342, pp. 467-475.

Ranjan Dash et al., "The potential of silicon anode based lithium ion batteries," Materials Today, Aug. 2016, vol. 19, pp. 483-484.

Hui Wu et al., "Stable cycling of double-walled silicon nanotube battery anodes through solid-electrolyte interphase control," Nature Nanotechnology, Mar. 25, 2012, vol. 7, pp. 310-315.

Mingyuan Ge et al., "Scalable preparation of porous silicon nanoparticles and their application for lithium-ion battery anodes," Nano Research, 2013, vol. 6, pp. 174-181.

Office Action issued on Sep. 19, 2022, for corresponding Korean Patent Application No. 10-2020-0137955 along with an English machine translation (9 pages).

Yuanchao Zhu et al., "Prelithiated Surface Oxide Layer Enabled High-Performance Si Anode for Lithium Storage", ACS Applied Materials & Interfaces, May 2, 2019, vol. 11, pp. 18305-18312.

* cited by examiner

MULTI-LAYER COMPOSITE STRUCTURE CONTAINING PRE-LITHIATED METAL OXIDE AND METHOD FOR PREPARING THE SAME

CROSS-REFERENCE TO RELATED APPLICATIONS

A claim for priority under 35 U.S.C. § 119 is made to Korean Patent Application No. 10-2020-0137955 filed on Oct. 23, 2020, in the Korean Intellectual Property Office, the entire contents of which are hereby incorporated by reference.

BACKGROUND

Embodiments of the inventive concept described herein relate to a multi-layer composite structure containing a pre-lithiated metal oxide and a method for preparing the same.

Recently, a development of a lithium secondary battery used as a large-capacity power storage device is being actively researched to meet requirements of a new commercial market.

In particular, the lithium secondary battery is rapidly expanding use thereof as a large-scale power storage device for eco-friendly energy, a micro-power storage device for a biocompatible device, an energy source for a mobile device, a power source for electric and hybrid electric vehicles, and the like. Accordingly, securing long-term cycling stability and high energy density and efficiency are receiving attention as an important task.

Such a lithium secondary battery includes a positive electrode, a negative electrode, a separator disposed between the positive electrode and the negative electrode to separate the positive electrode and the negative electrode from each other, and an electrolyte communicating electrochemically. The negative electrode is manufactured using a silicon-based material such as Si, $SiO_x$, Si—C, Si-Metal alloy, and the like. In particular, the Si material is considered as one of next-generation negative electrode materials for the lithium secondary battery because the Si material is abundant in resources and provides a high theoretical capacity with a low discharge potential as the negative electrode material.

However, a silicon negative electrode using Si among the silicon-based materials has a limitation in that a crystal structure changes based on insertion and release of lithium ions during charging and discharging, which accompanies rapid volume expansion. In addition, it has been reported that a silicon oxide negative electrode using $SiO_x$ among the silicon-based materials has a limitation in that a solid electrolyte interface (SEI), which should act as a protective film, is formed unstable on a surface thereof, and the unstable SEI causes consumption of the lithium ions with an irreversible reaction, which causes the lithium secondary battery to self-discharge.

In other words, the volume expansion and the unstable SEI formation of the silicon-based negative electrode ultimately cause a structural deterioration problem to accelerate a capacity fading speed of the lithium secondary battery and reduce a cycle life, which hinders the application of the silicon-based material as the negative electrode material.

To overcome such limitations, a research on a coating technology that improves structural stability and reduces the SEI formation, a research on stabilizing the SEI using an electrolyte additive, and a research on nanostructure development to solve the volume expansion are underway.

Nevertheless, the above researches have not clearly resolved capacity fading caused by the combination of the volume expansion and the unstable SEI formation, and a research on lithium ion trapping, which is a common cause of the volume expansion and the unstable SEI formation, is sluggish.

SUMMARY

Embodiments of the inventive concept provide a multi-layer composite structure containing a pre-lithiated metal oxide and a method for preparing the same that may use an eco-friendly process and reduce a lithium ion trapping phenomenon that occurs as a result of incomplete de-lithiation to prevent acceleration of a capacity fading speed of a lithium secondary battery resulted from a structural fading effect during a charging/discharging cycle.

According to an exemplary embodiment, a multi-layer composite structure containing a pre-lithiated metal oxide includes a negative electrode particle, a first coating layer disposed on the negative electrode particle and containing a conductive carbon material, and a second coating layer disposed on the first coating layer and containing the pre-lithiated metal oxide formed through a lithiation reaction.

In addition, the negative electrode particle may be at least one selected from a group consisting of silicon, silicon oxide, silicon carbide, silicon metal alloy, and combinations of silicon, silicon oxide, silicon carbide, and silicon metal alloy.

The conductive carbon material may contain at least one conductive material selected from a group consisting of graphite, carbon black, carbon fiber, and combinations of graphite, carbon black, and carbon fiber.

The pre-lithiated metal oxide may be selected from a group consisting of a lithium aluminum oxide ($LiAl_2O_3$), a lithium magnesium oxide (LiMgO), and a lithium zinc oxide (LiZnO).

Formation of a lithium oxide by a reaction of lithium ions and oxygen ions and lowering of a lithium insertion speed occurred during an insertion process of lithium into the pre-lithiated metal oxide may be suppressed by the pre-lithiated metal oxide.

According to an exemplary embodiment, a method for preparing a multi-layer composite structure containing a pre-lithiated metal oxide includes a first step of mixing a negative electrode particle with a buffer solution containing dopamine to prepare a first particle mixture with a polydopamine coating layer formed on the negative electrode particle, a second step of dispersing the first particle mixture in a metal precursor aqueous solution to prepare a second particle mixture with a metal oxide coating layer formed on the polydopamine coating layer, and a third step of pre-lithiating the second particle mixture by mixing the second particle mixture with a lithium precursor and then heat-treating the second particle mixture.

The first step may include a step of stirring the negative electrode particle and dopamine hydrochloride in distilled water to form a stirred mixture, and a step of polymerizing the dopamine on the negative electrode particle by adding a tris-HCl buffer solution to the stirred mixture.

The second step includes a step of preparing the metal precursor aqueous solution, a step of dispersing and stirring the first particle mixture in the prepared metal precursor aqueous solution, and a step of performing a wet synthesis treatment including hydrothermal synthesis, solvothermal synthesis, and sol-gel synthesis on the stirred aqueous solution.

In the third step, through the heat treatment, the polydopamine coating layer may be carbonized to form a conductive carbon material, and the metal oxide coating layer may form a pre-lithiated metal oxide as a chemical bonding reaction with the lithium precursor is induced.

The metal precursor aqueous solution may contain a metal precursor, distilled water, and urea, the metal precursor may be at least one precursor compound for a metal material selected from a group consisting of aluminum, titanium, and manganese, and the precursor compound may be selected from a group consisting of a salt, an organic-inorganic compound, and an oxide.

The sol-gel synthesis may be performed by heating the stirred aqueous solution at a temperature in a range from 70 to 90° C. for 4 hours, and then, increasing the heating temperature to 120° C. to completely evaporate a solvent.

The lithium precursor may be one material selected from a group consisting of lithium acetate ($C_2H_3LiO_2$), lithium hydroxide (LiOH), lithium nitrate ($LiNO_3$), and lithium chloride (LiCl).

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
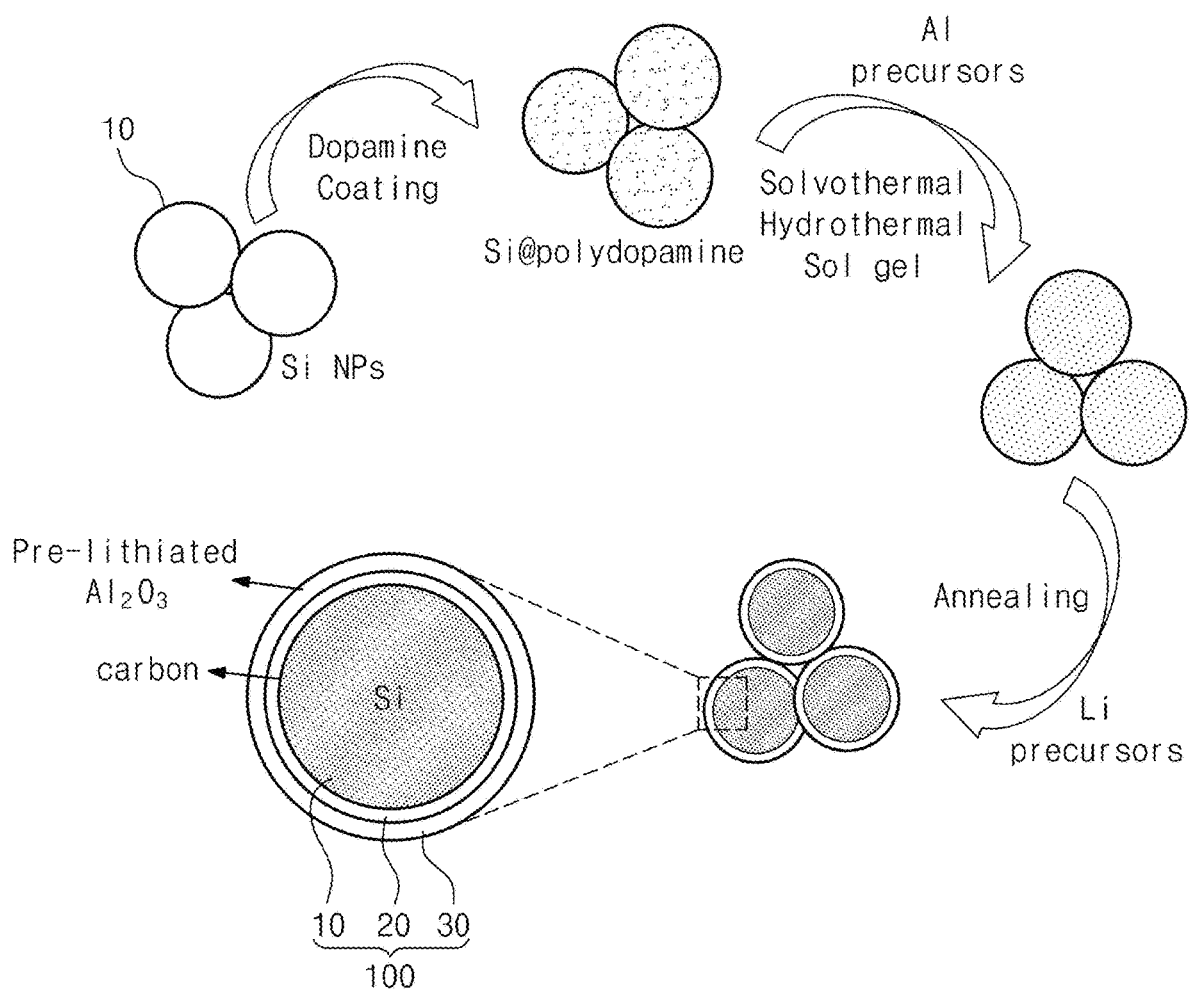
FIG. 1 is a view for illustrating a process for preparing a multi-layer composite structure containing a pre-lithiated metal oxide according to an embodiment of the inventive concept.

Hereinafter, specific embodiments of the inventive concept will be described in detail with reference to the drawings attached hereto.

In addition, in describing the inventive concept, when it is determined that a detailed description of a related known component or function may obscure the gist of the inventive concept, the detailed description thereof will be omitted.

Embodiments of the inventive concept are provided to more fully describe the inventive concept to those of ordinary skill in the art. The following embodiment may be transformed into several different forms. The scope of the inventive concept is not limited to the following embodiment.

Rather, such embodiments are provided so as to make the present disclosure more thorough and complete, and to fully convey the spirit of the inventive concept to those skilled in the art.

In addition, in the following drawings, each component is exaggerated for convenience and clarity of description, and the same reference numerals in the drawings refer to the same elements. As used herein, the term "and/or" includes one or all combinations of one or more of those listed items.

The terminology used herein is for the purpose of describing specific embodiments only and is not intended to be limiting of the inventive concept.

As used herein, the singular forms 'a' and 'an' are intended to include the plural forms as well, unless the context clearly indicates otherwise. Also, as used herein, "comprise" and/or "comprising" refers to the presence of the recited shapes, numbers, steps, operations, members, elements, and/or groups thereof.

It does not exclude the presence or addition of one or more other shapes, numbers, operations, members, elements, and/or groups.

Figure 2:
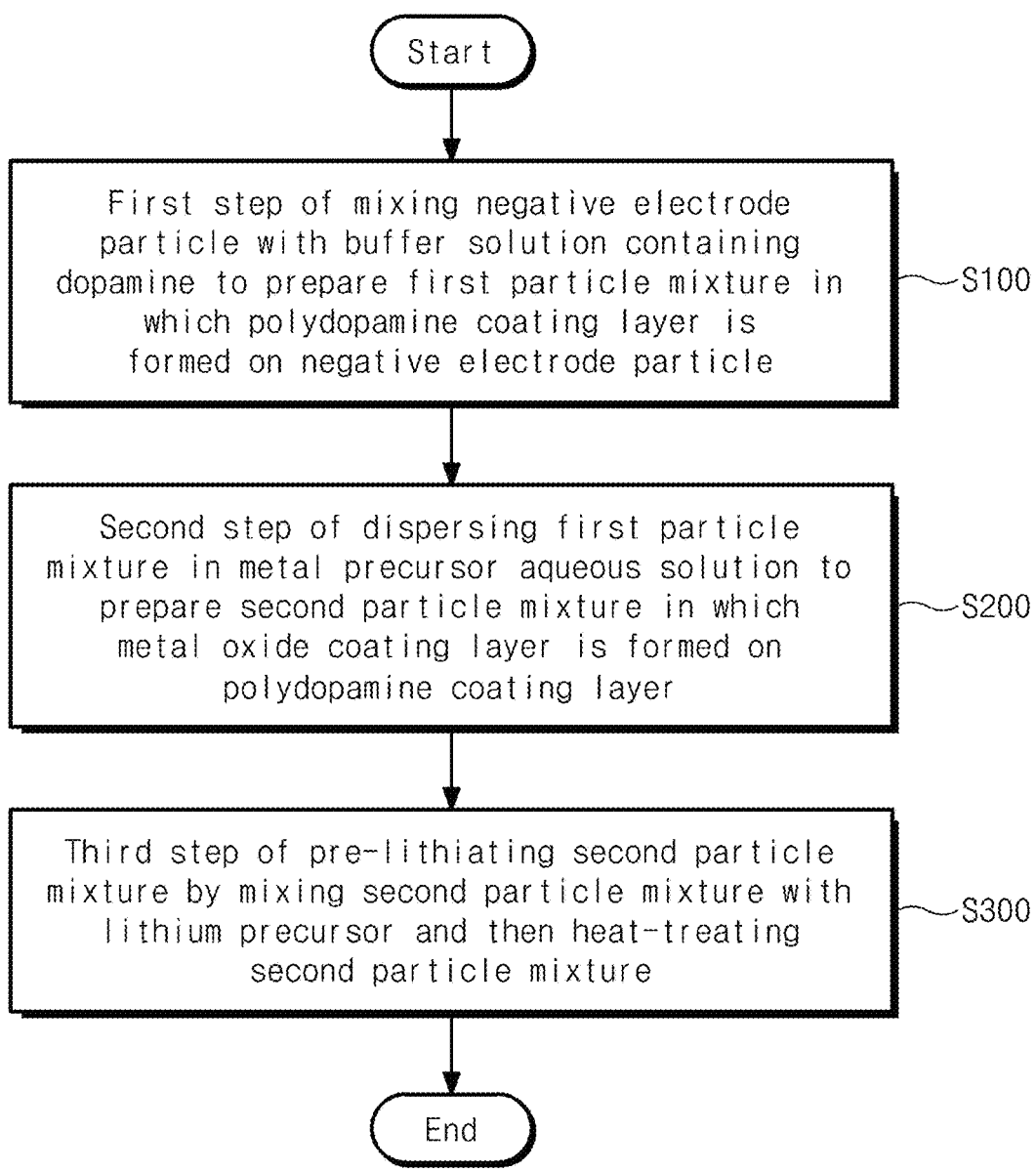
FIG. 2 is a flowchart for illustrating a method for preparing a multi-layer composite structure containing a pre-lithiated metal oxide according to an embodiment of the inventive concept.

FIG. 1 is a view for illustrating a process for preparing a multi-layer composite structure containing a pre-lithiated metal oxide according to an embodiment of the inventive concept, and FIG. 2 is a flowchart for illustrating a method for preparing a multi-layer composite structure containing a pre-lithiated metal oxide according to an embodiment of the inventive concept.

A multi-layer composite structure of the inventive concept may be used as a negative electrode constituting a lithium secondary battery, and may have a core/shell structure. Specifically, in the multi-layer composite structure, an outermost shell layer may be made of a pre-lithiated metal oxide, a negative electrode particle may be disposed inside the outermost shell layer as a core, and a conductive carbon material may be disposed as an inner shell layer.

In addition, the pre-lithiated metal oxide may prevent a decrease in efficiency and a mechanical destruction of the particle resulted from unstable lithium ion insertion-extraction, and may act as an artificial solid electrolyte interface (SEI), thereby forming a stable solid electrolyte interface (SEI) on a surface of the negative electrode particle.

Referring to FIG. 1, a multi-layer composite structure 100 containing a pre-lithiated metal oxide according to an embodiment of the inventive concept includes a negative electrode particle 10, a first coating layer 20 disposed on the negative electrode particle 10 and containing the conductive carbon material, and a second coating layer 30 disposed on the first coating layer 20 and containing a pre-lithiated metal oxide formed through a lithiation reaction.

The negative electrode particle 10 may contain one material selected from a group consisting of silicon (Si), silicon oxide ($SiO_x$), silicon carbide (SiC), and silicon metal alloy (MG-Si) having a high theoretical capacity.

In addition, the negative electrode particle 10 may be inserted into a layer made of the conductive carbon material and an oxide so as not to come into direct contact with an electrolyte.

In addition, the negative electrode particle 10 may have a nano size or a micro size. The negative electrode particle 10 according to the inventive concept preferably has the nano size, but the inventive concept is not limited thereto.

The first coating layer 20 may contain the conductive carbon material to prevent the negative electrode particle 10 from being exposed to the electrolyte, and to reduce volume expansion of the negative electrode particle 10 while improving electrical conductivity.

In addition, the conductive carbon material may contain one conductive material selected from a group consisting of graphite, carbon black, and carbon fiber.

The negative electrode particle 10, which is a silicon-based material, is widely used as a negative electrode material because of excellent cycle characteristics and good output characteristics, but has disadvantages in that destruction occurs during a charging/discharging cycling as insertion of lithium (Li) is difficult and the inserted lithium is concentrated in a specific region because of slow interfacial reaction. Accordingly, by coating the negative electrode particle 10 with the first coating layer 20 containing the conductive carbon material, it is possible to improve the structural stability and the electrical conductivity simultaneously while maintaining the excellent charging/discharging cycling characteristics and output characteristics, which are inherent characteristics, of the negative electrode particle 10.

The second coating layer 30 contains the pre-lithiated metal oxide so as to prevent the formation of the unstable solid electrolyte interface that is formed between the negative electrode particle 10 and the electrolyte while secondarily reducing the volume expansion of the negative electrode particle 10 like the first coating layer 20.

In addition, the pre-lithiated metal oxide may be formed by lithiating a metal oxide prepared using a metal having good oxygen affinity. Specifically, the pre-lithiated metal oxide may include one material selected from a group consisting of a lithium aluminum oxide ($LiAl_2O_3$), a lithium magnesium oxide (LiMgO), and a lithium zinc oxide (LiZnO).

In other words, the pre-lithiated metal oxide includes a metal oxide using a metal material such as aluminum, magnesium, zinc, and the like having high affinity for oxygen ions, and at the same time, is lithiated, thereby further improving affinity with lithium ions. Accordingly, while maintaining the excellent charging/discharging cycling characteristics and output characteristics, which are the inherent characteristics, of the negative electrode particle 10, a lithium ion trapping effect may be effectively reduced, thereby further delaying a capacity fading phenomenon of the lithium secondary battery.

Specifically, in a general lithium secondary battery, a negative electrode using Si had problems that a destruction occurs as the reversible insertion and extraction of the lithium ions proceed while maintaining electrical properties, and side effects such as the lithium ion trapping resulted from the above-described destruction are caused.

Accordingly, a metal oxide such as $SiO_2$ was used to replace Si, but the unstable solid electrolyte interface (SEI) is formed on a surface of $SiO_2$ at the same time as an effect of suppressing the destruction resulted from the volume expansion is exhibited. This not only caused initial irreversibility, but also caused the lithium ion trapping problem during a continuous charging/discharging process. In addition, in the case of $SiO_2$, there was an interfacial problem in which the lithium ions are not able to be deeply inserted into the $SiO_2$, and staying at a high concentration on the surface of the $SiO_2$.

For this reason, the inventive concept utilizes the metal oxide as the negative electrode in the lithium secondary battery to solve the interfacial problem, but utilizes the oxide using aluminum, magnesium, and zinc having the high affinity with the oxygen ions.

In one example, the above-mentioned aluminum, magnesium, and zinc oxides serve as the stable solid electrolyte interface to suppress the formation of the unstable solid electrolyte interface on the surface of $SiO_2$, thereby lowering an irreversible reaction in which a lithium oxide is formed by a reaction of the lithium ions and the oxygen ions. However, the above-mentioned aluminum, magnesium, and zinc oxides had a disadvantage in that a lithium insertion speed is lowered during a process in which the lithium ions are inserted into the above-mentioned aluminum, magnesium, and zinc oxides.

Accordingly, the inventive concept used the pre-lithiated metal oxide formed through the lithiation reaction of the metal oxide including the above-mentioned aluminum, magnesium, and zinc oxides. The pre-lithiated metal oxide suppresses the formation of the lithium oxide, which is an advantage of the aluminum, magnesium, and zinc oxides, and at the same time, suppresses the lowering of the lithium insertion speed occurred during the lithium ion insertion process due to lithium contained in the pre-lithiated metal oxide.

That is, the multi-layer composite structure containing the pre-lithiated metal oxide according to an embodiment of the inventive concept suppresses the formation of the lithium oxide and the lowering of the lithium insertion speed to minimize the lithium ion trapping, which is a fundamental problem of the lithium secondary batteries, thereby securing stable charging and discharging capacity and increasing stability and capacity of the lithium secondary battery by suppressing a self-discharge phenomenon.

In addition, the first coating layer 20 and the second coating layer 30 may be sequentially disposed on a surface of the negative electrode particle 10 to form a core/multi-layer shell structure. More specifically, the negative electrode particle 10 is disposed in the core, the first coating layer 20 is disposed in the inner shell, and the second coating layer 30 is disposed in the outermost shell.

Hereinafter, the process for preparing of the multi-layer composite structure containing the pre-lithiated metal oxide of the inventive concept will be described with reference to FIG. 1.

First, a polydopamine coating layer may be formed on the surface of the negative electrode particle 10 using a buffer solution containing dopamine.

Thereafter, a metal oxide coating layer may be formed on the surface of the negative electrode particle 10 on which the polydopamine coating layer is formed as the negative electrode particle 10 is dispersed in an aqueous solution containing a metal precursor and is subjected to a wet synthesis treatment including hydrothermal synthesis, solvothermal synthesis, and sol-gel synthesis.

Next, the negative electrode particle 10 on which the polydopamine coating layer and the metal oxide coating layer are formed is heat-treated in an argon atmosphere using a lithium precursor, so that the multi-layer composite structure 100 having the core/multi-layer shell structure in which the negative electrode particles 10, the second coating layer 20, and the third coating layer 30 are sequentially disposed may be prepared.

Specifically, through the heat treatment, the polydopamine coating layer may be carbonized to form the conductive carbon material, and the metal oxide coating layer may form the pre-lithiated metal oxide through the lithiation reaction, which is a chemical bonding reaction with the lithium precursor.

The negative electrode particle 10 of the multi-layer composite structure 100 containing the pre-lithiated metal oxide according to an embodiment of the inventive concept is preferably a silicon (Si) particle, the conductive carbon material is preferably the graphite, and a the pre-lithiated metal oxide is preferably the lithium aluminum oxide.

Accordingly, in the multi-layer composite structure 100 containing the pre-lithiated metal oxide according to an embodiment of the inventive concept, the pre-lithiated metal oxide is disposed in the outermost shell of the negative electrode particle, and the pre-lithiated metal oxide acts as the artificial solid electrolyte interface (SEI) to form the stable solid electrolyte interface.

In addition, the multi-layer composite structure 100 containing the pre-lithiated metal oxide according to an embodiment of the inventive concept may effectively reduce the lithium ion trapping, which causes unstable initial coulombic efficiency, as the stable solid-electrolyte interface is formed.

In addition, the inventive concept provides the method for preparing the multi-layer composite structure containing the pre-lithiated metal oxide.

Referring to FIG. 2, the method for preparing the multi-layer composite structure containing the pre-lithiated metal oxide according to an embodiment of the inventive concept includes a first step (S100) of mixing the negative electrode particle with the buffer solution containing the dopamine to prepare a first particle mixture in which the polydopamine coating layer is formed on the negative electrode particle, a second step (S200) of dispersing the first particle mixture in the metal precursor aqueous solution to prepare a second particle mixture in which the metal oxide coating layer is formed on the polydopamine coating layer, and a third step (S300) of pre-lithiating the second particle mixture by mixing the second particle mixture with the lithium precursor and then heat-treating the second particle mixture.

The first step (S100) is a step of disposing the polydopamine coating layer on the negative electrode particle 10 by coating the dopamine on the negative electrode particle 10 to form the first coating layer 20 containing the conductive carbon material on the negative electrode particle 10, which is the core.

Specifically, the first step (S100) may include a step (S110) of stirring the negative electrode particle 10 and dopamine hydrochloride in distilled water to form a stirred mixture, and a step (S120) of polymerizing the dopamine on the negative electrode particle 10 by adding a tris-HCl buffer solution, which is a crosslinking agent, to the stirred mixture.

In this connection, a weight of the dopamine hydrochloride may be in a range from 40 to 60 mg, and a Tris-HCl buffer solution in a range from pH 8 to pH 9 may be used.

In addition, the polymerization step (S120) is preferably performed for 12 to 15 hours.

The second step (S200) is a step of disposing the metal oxide coating layer on the polydopamine coating layer by coating the metal oxide on the polydopamine coating layer to form the second coating layer 30 containing the pre-lithiated metal oxide on the first coating layer 20, which is the inner shell.

Specifically, the second step (S200) may include a step (S210) of preparing the metal precursor aqueous solution, a step (S220) of dispersing and stirring the first particle mixture in the prepared metal precursor aqueous solution, and a step (S230) of performing the wet synthesis treatment including the hydrothermal synthesis, the solvothermal synthesis, and the sol-gel synthesis on the stirred aqueous solution.

In addition, the metal precursor aqueous solution in the second step (S200) contains the metal precursor, the distilled water, and urea.

In this connection, the metal precursor is at least one precursor compound for a metal material selected from a group consisting of aluminum, titanium, and manganese. Specifically, the precursor compound may be selected from a group consisting of a salt, an organic-inorganic compound, or an oxide.

For example, the metal precursor may be at least one aluminum precursor compound for aluminum. The aluminum precursor compound is selected from a group consisting of aluminum chloride ($AlCl_3$), aluminum isopropoxide ($C_9H_{21}O_3Al$), aluminum sulfate ($Al_2(SO_4)_3$), and aluminum nitrate ($Al(NO_3)_3$).

In the method for preparing the multi-layer composite structure containing the pre-lithiated metal oxide according to an embodiment of the inventive concept, the metal precursor is preferably aluminum nitrate.

In addition, in the step of preparing the metal precursor aqueous solution (S210), the metal precursor aqueous solution may be prepared by adding 3 to 5 g of the metal precursor to 50 mL of the distilled water containing 0.1 g of the urea.

In addition, in the wet synthesis treatment step (S230), the hydrothermal synthesis may be performed in an autoclave at a temperature in a range from 70 to 90° C. for 5 to 7 hours.

In addition, in the wet synthesis treatment step (S230), the solvothermal synthesis is performed in a Celsius oil bath at a temperature in a range from 70 to 90° C. for 3 to 5 hours.

In addition, in the wet synthesis treatment step (S230), the sol-gel synthesis may be performed by heating the stirred aqueous solution at a temperature in a range from 70 to 90° C. for 4 hours, and then, increasing the heating temperature to 120° C. to completely evaporate a solvent.

In the method for preparing the multi-layer composite structure containing the pre-lithiated metal oxide according to an embodiment of the inventive concept, it is preferable that the wet synthesis treatment step (S230) is performed as the sol-gel synthesis among the hydrothermal synthesis, the solvothermal synthesis, and the sol-gel synthesis.

The third step (S300) is a method of forming the first coating layer 20 containing the conductive carbon material on the negative electrode particle 10 and forming the second coating layer 30 containing the pre-lithiated metal oxide on the first coating layer 20 by heat-treating the dopamine coating layer and the metal oxide coating layer sequentially disposed on the negative electrode particle 10.

Specifically, in the third step (S300), through the heat treatment in the argon atmosphere, the polydopamine coating layer may be carbonized to form the conductive carbon material, and the metal oxide coating layer may form the pre-lithiated metal oxide as the chemical bonding reaction with the lithium precursor is induced.

That is, the metal oxide coating layer may form the second coating layer 30 containing the pre-lithiated metal oxide through a pre-lithiation reaction using the heat treatment.

In addition, the lithium precursor may contain one material selected from a group consisting of lithium acetate ($C_2H_3LiO_2$), lithium hydroxide (LiOH), lithium nitrate ($LiNO_3$), and lithium chloride (LiCl).

In the method for preparing the multi-layer composite structure containing the pre-lithiated metal oxide according to an embodiment of the inventive concept, it is preferable to use lithium hydroxide as the lithium precursor.

<Example 1> Preparation of Multi-Layer Composite Structure Containing Pre-Lithiated Metal Oxide Step S100: the silicon particle and 50 mg of the dopamine hydrochloride were stirred in the distilled water, and the tris-HCl buffer solution (pH 8.5) was added to the stirred mixture and polymerized for 13 hours to prepare a first silicon particle mixture in which the polydopamine coating layer is formed on the silicon particle.

Step S200: 4 g of the aluminum nitrate was added into 50 mL of the distilled water containing 0.1 g of the urea to prepare an aluminum precursor aqueous solution, and the prepared first silicon particle mixture was dispersed in the prepared aluminum precursor aqueous solution and stirred for 45 minutes.

Thereafter, the stirred aqueous solution was heated at 80° C. for 4 hours using the sol-gel synthesis, and then, the heating temperature was increased to 120° C. to completely evaporate the solvent, thereby preparing a second silicon particle mixture.

Step S300: The prepared second silicon particle mixture was mixed with lithium hydroxide, and then, was subjected to the heat treatment to prepare the multi-layer composite structure containing the pre-lithiated metal oxide.

<Comparative Examples 1, 2, and 3> Preparation of Multi-Layer Composite Structure Based on Aluminum Precursor Except for replacing aluminum nitrate with one of aluminum isopropoxide, aluminum sulfate, and aluminum chloride in step S200 in Example 1, the multi-layer composite structure containing the pre-lithiated metal oxide was prepared in the same manner as in Example 1 above.

In this connection, the one using aluminum chloride as the metal precursor is Comparative Example 1, the one using aluminum isopropoxide as the metal precursor is Comparative Example 2, and the one using aluminum sulfate as the metal precursor is Comparative Example 3.

<Comparative Examples 4 and 5> Preparation of Multi-Layer Composite Structure Based on Wet Synthesis Treatment Except for replacing the sol-gel synthesis with one of the hydrothermal synthesis and the solvothermal synthesis in step S200 in Example 1, the multi-layer composite structure containing the pre-lithiated metal oxide was prepared in the same manner as in Example 1 above.

In this connection, the one that is subjected to the solvothermal synthesis is Comparative Example 4, and the one that is subjected to the hydrothermal synthesis is Comparative Example 5.

More specifically, the hydrothermal synthesis treatment was performed in the autoclave at 80° C. for 6 hours. In addition, the solvothermal synthesis treatment was performed in the oil bath at 80° C. for 6 hours.

<Comparative Examples 6 and 7> Preparation of SiC Structure and Multi-Layer Composite Structure Containing Metal Oxide In Example 1, the first silicon particle mixture prepared in step S100 was heat-treated to prepare a SiC structure (Si@C).

In addition, in Example 1, the second silicon particle mixture prepared through steps S100 and S200 was heat-treated to prepare a multi-layer composite structure (Si@C@ Al2O3) containing the metal oxide.

In this connection, the SiC structure is Comparative Example 6, and the multi-layer composite structure containing the metal oxide is Comparative Example 7.

<Example 2< Manufacturing of Lithium Secondary Battery Utilizing Negative Electrode Containing Multi-Layer Composite Structure of Example 1

1.3 M $LiPF_6$ was used as a positive electrode uses, an electrolyte containing 5% of fluoroethylene carbonate was used as the electrolyte, and the multi-layer composite structure of Example 1 was used as a negative electrode to manufacture the lithium secondary battery.

More specifically, the lithium secondary battery may be composed of a casting top, a gasket, a dry spring, a stainless steel spacer, the positive electrode, a separator, the negative electrode of the multi-layer composite structure of Example 1, and a casing bottom.

In addition, the casting top and bottom, the spring, and the spacer of the lithium secondary battery may contain stainless steel, the gasket may be made of plastic, and the separator may be made of polypropylene.

<Comparative Examples 8 and 9> Manufacturing of Lithium Secondary Battery Utilizing Negative Electrode Containing SiC Structure and Multi-Layer Composite Structure of Comparative Examples 6 and 7

Except for replacing the multi-layer composite structure of Example 1 with the SiC structure of Comparative Example 6 in Example 2, the lithium secondary battery was manufactured in the same manner as in Example 2 (Comparative Example 8).

Except for replacing the multi-layer composite structure of Example 1 with the multi-layer composite structure containing the metal oxide of Comparative Example 7 in Example 2, the lithium secondary battery was manufactured in the same manner as in Example 2 (Comparative Example 9).

<Experimental Example 1> Microstructure Evaluation of Multi-Layer Composite Structures Prepared Through Example 1 and Comparative Examples 1, 2, and 3

Figure 3:
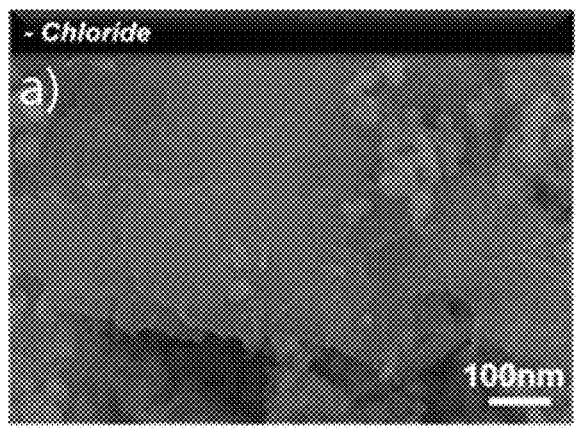
FIG. 3 shows SEM images of multi-layer composite structures containing pre-lithiated metal oxides prepared based on various aluminum precursors in an embodiment of the inventive concept.
Figure 3:
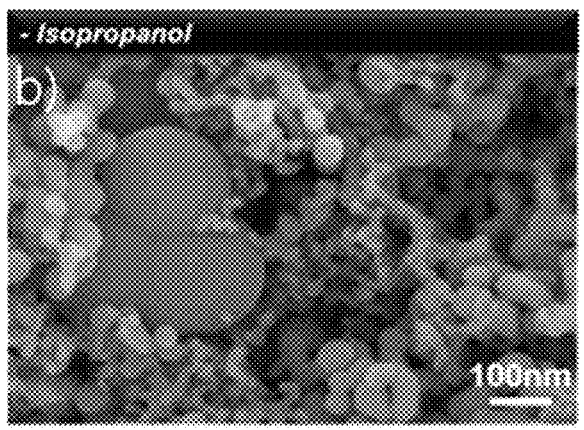
Figure 3:
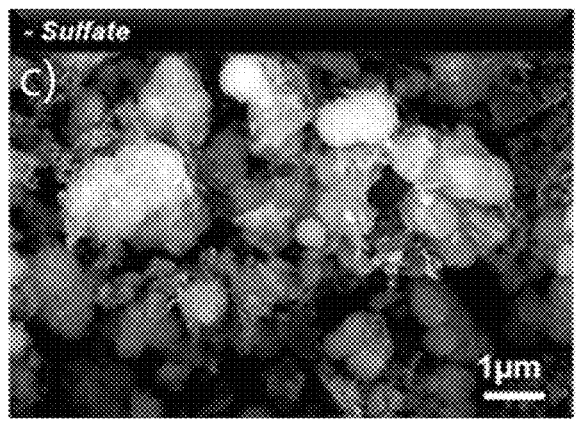
Figure 3:
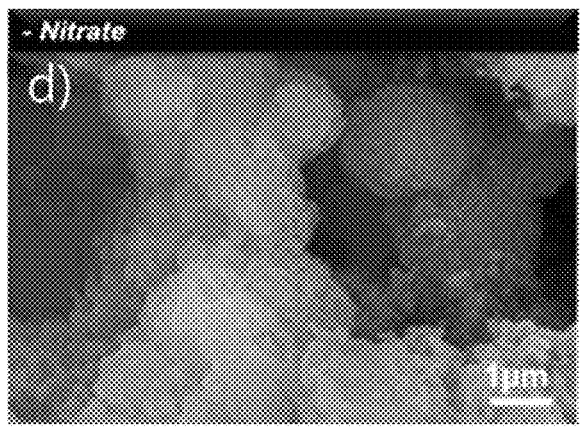

For microstructure evaluation of the multi-layer composite structures containing the pre-lithiated metal oxides according to the inventive concept, microstructures of the multi-layer composite structures prepared through Example 1 and Comparative Examples 1, 2, and 3 are shown in FIG. 3.

FIG. 3 shows SEM images of multi-layer composite structures containing pre-lithiated metal oxides prepared based on various aluminum precursors in an embodiment of the inventive concept.

In addition, FIG. 3(a) is the multi-layer composite structure using aluminum chloride as the aluminum precursor, FIG. 3(b) is the multi-layer composite structure using aluminum isopropoxide as the aluminum precursor, FIG. 3(c) is the multi-layer composite structure using aluminum sulfate as the aluminum precursor, and FIG. 3(d) is the multi-layer composite structure using aluminum nitrate as the aluminum precursor.

As shown in FIG. 3, it may be seen that, except for the multi-layer composite structure (Example 1) using aluminum nitrate as the aluminum precursor, Comparative Examples 1, 2, and 3 have structures in which an aluminum oxide and the silicon particles are non-uniformly mixed with each other.

In contrast, as shown in FIG. 3(d), it was identified that a sheet-type structure in which the silicon particles are encapsulated with the aluminum oxide was formed in Example 1, which is the multi-layer composite structure using aluminum nitrate as the aluminum precursor.

That is, it was identified that aluminum nitrate provides a uniform coating when compared to aluminum chloride, aluminum isopropoxide, and aluminum sulfate.

<Experimental Example 2< Microstructure Evaluation of Multi-Layer Composite Structures Prepared Through Example 1 and Comparative Examples 4 and 5

Figure 4:
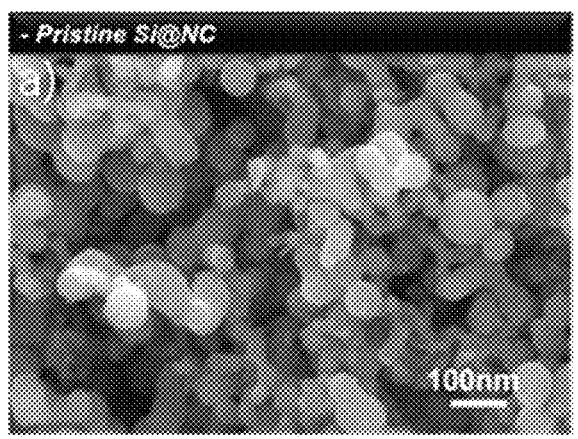
FIG. 4 shows SEM images of multi-layer composite structures containing pre-lithiated metal oxides prepared based on various wet synthesis treatments in an embodiment of the inventive concept.
Figure 4:
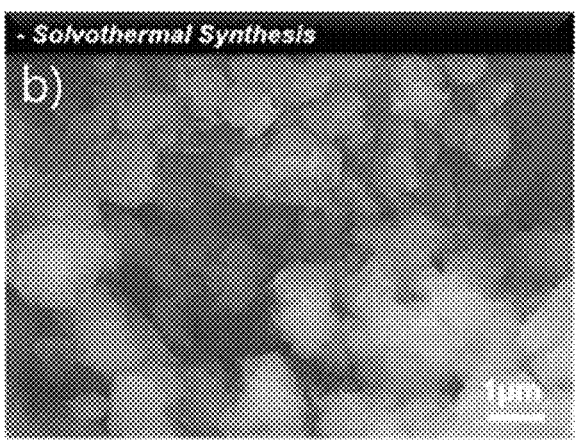
Figure 4:
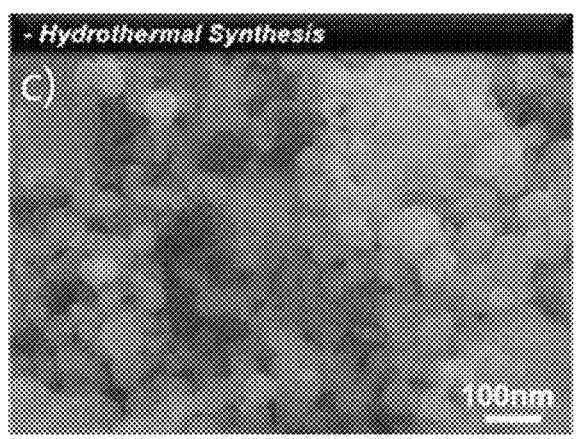
Figure 4:
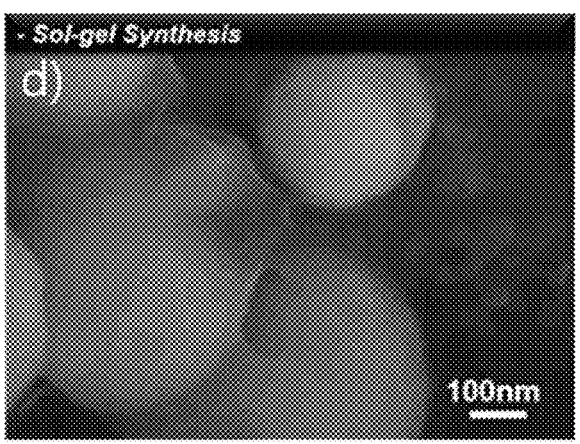
Figure 5:
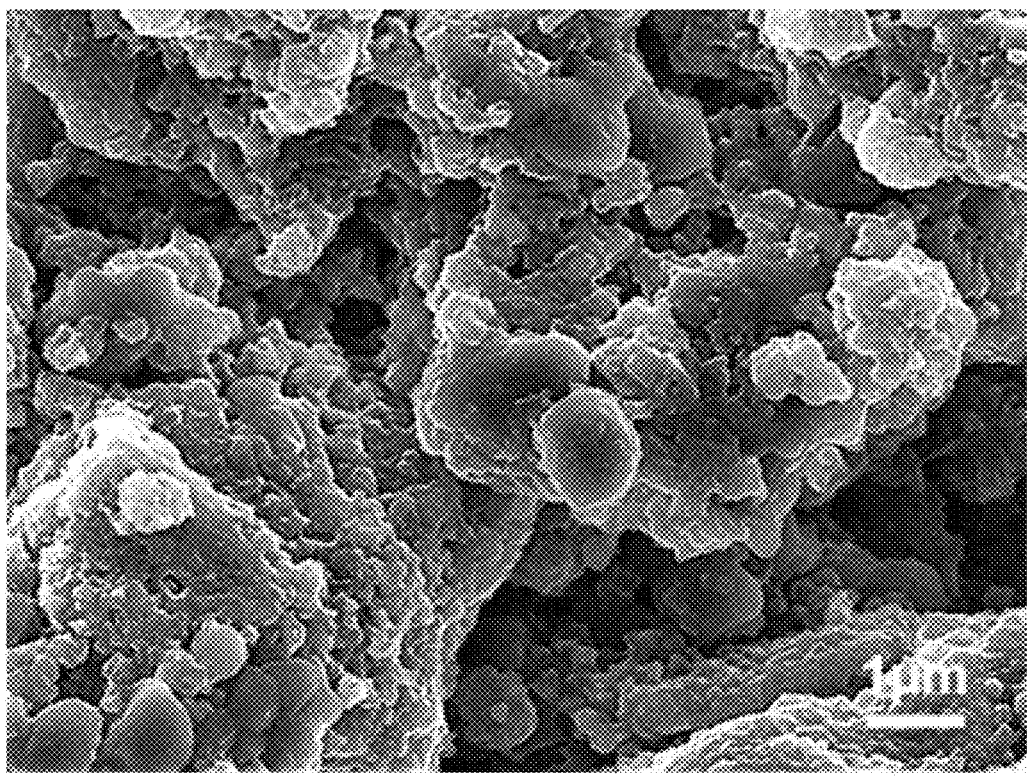
FIG. 5 is an SEM image of a multi-layer composite structure containing a pre-lithiated metal oxide prepared using an aluminum nitrate precursor and a sol-gel synthesis technology in an embodiment of the inventive concept.

For microstructure evaluation of the multi-layer composite structures containing the pre-lithiated metal oxides according to the inventive concept, microstructures of the multi-layer composite structures prepared through Example 1 and Comparative Examples 4 and 5 are shown in FIGS. 4 and 5.

FIG. 4 shows SEM images of multi-layer composite structures containing pre-lithiated metal oxides prepared based on various wet synthesis treatments in an embodiment of the inventive concept, and FIG. 5 is an SEM image of a multi-layer composite structure containing a pre-lithiated metal oxide prepared using an aluminum nitrate precursor and a sol-gel synthesis technology in an embodiment of the inventive concept.

In addition, FIG. 4(a) is a structure (Si@NC) before the wet synthesis treatment, FIG. 4(b) is a multi-layer composite structure using the solvothermal synthesis, FIG. 4(c) is a multi-layer composite structure using the hydrothermal synthesis, and FIG. 4(d) is a multi-layer composite structure using the sol-gel synthesis.

As shown in FIG. 4, it was identified that a thin sheet or film was formed on the structure before the wet synthesis treatment regardless of the type of the synthetic treatment used.

In addition, as shown in FIGS. 4(d) and 5, it may be seen that the sol-gel synthesis provides a more uniform coating layer than the polydopamine coating, and the uniform coating layer may induce excellent interaction through surface charge control (zeta-potential control) to be achieved between the SiC structure and the metal oxide.

In addition, the sol-gel synthesis provides a fast solvent evaporation process, thereby avoiding oxidation of the silicon particles on which the polydopamine coating layer is not formed to SiOx.

In addition, referring to FIG. 5, it was identified that infiltration of the lithium ions into the multi-layer composite structure causes the multi-layer composite structure to have a rough surface with high surface energy.

In addition, it was identified that the first coating layer containing the conductive carbon material is completely covered by a pre-lithiated aluminum oxide.

<Experimental Example 3> Raman Analysis Results of Multi-Layer Composite Structures Prepared Through Example 1 and Comparative Examples 6 and 7

To identify the pre-lithiated metal oxides of the multi-layer composite structures containing the pre-lithiated metal oxides according to the inventive concept, Raman spectra of the multi-layer composite structures prepared through Example 1 and Comparative Examples 6 and 7 were analyzed. In addition, the analysis result is shown in FIG. 6.

Figure 6:
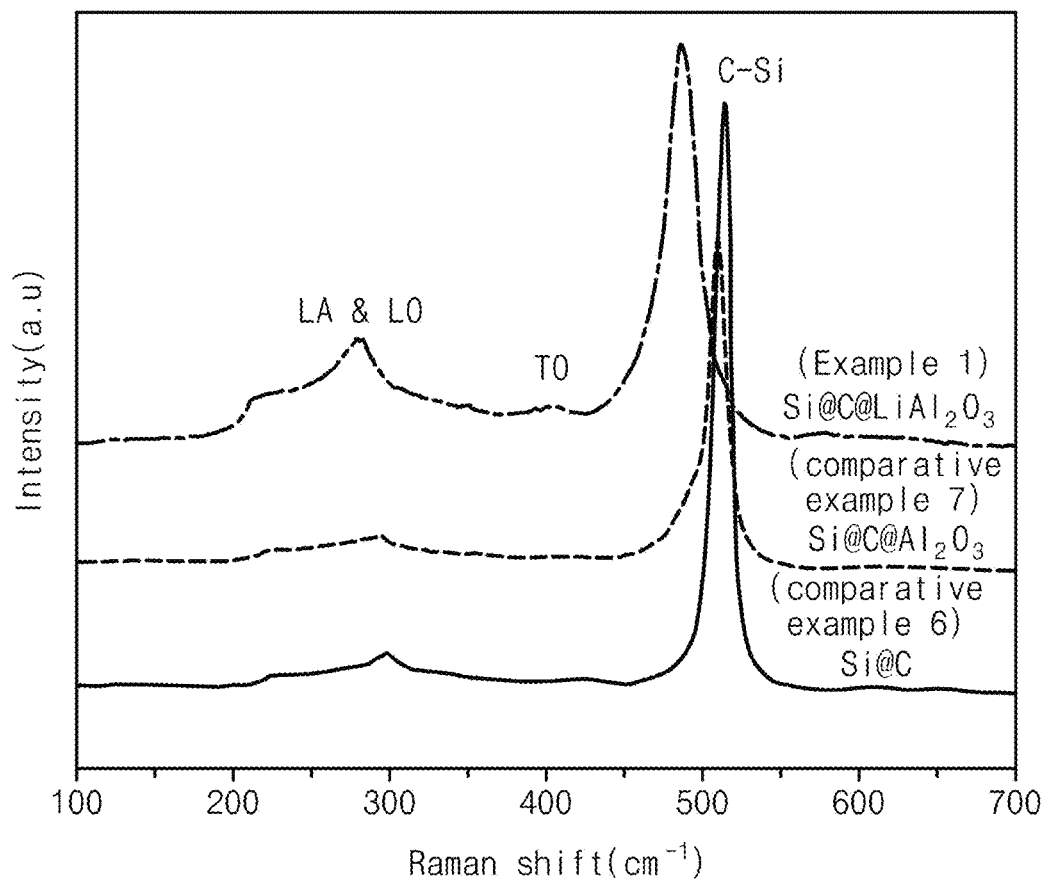
FIG. 6 is a Raman analysis result graph of multi-layer composite structures prepared according to Example and Comparative Examples of the inventive concept.

FIG. 6 is a Raman analysis result graph of multi-layer composite structures prepared according to Example and Comparative Examples of the inventive concept.

As shown in FIG. 6, at 510 $cm^{-1}$, peak values of the SiC structure (Comparative Example 6) and the multi-layer composite structure containing the metal oxide (Comparative Example 7) were observed, and the peak values mean peaks on silicon (Si). In other words, it may be seen that the structures according to Comparative Example 6 and Comparative Example 7 contain the Si particles.

In addition, in a case of Example 1, it may be seen that the peak on silicon is shifted to the left. This means that the lithium ions are inserted to an interstitial site on silicon (Si). More specifically, it was identified that amorphization of a silicon (Si) phase has somewhat occurred by the lithiation reaction in the multi-layer composite structure containing the pre-lithiated metal oxide (Example 1).

<Experimental Example 4> Electrochemical Performance Evaluation of Lithium Secondary Batteries Manufactured Through Example 2 and Comparative Examples 8 and 9

For electrochemical performance evaluation of the lithium secondary batteries including the negative electrodes using the multi-layer composite structures according to the inventive concept, charging and discharging characteristics, lifespan characteristics, and self-discharging characteristics of the lithium secondary batteries manufactured through Example 2 and Comparative Examples 8 and 9 were identified. The identification result is shown in FIGS. 7, 8 and 9.

A charging/discharging test was performed in a voltage range from 0 to 1.2 V to evaluate capacity retention characteristics based on the discharging capacity. In this connection, the charging/discharging cycle was repeated a total of 200 times.

Figure 7:
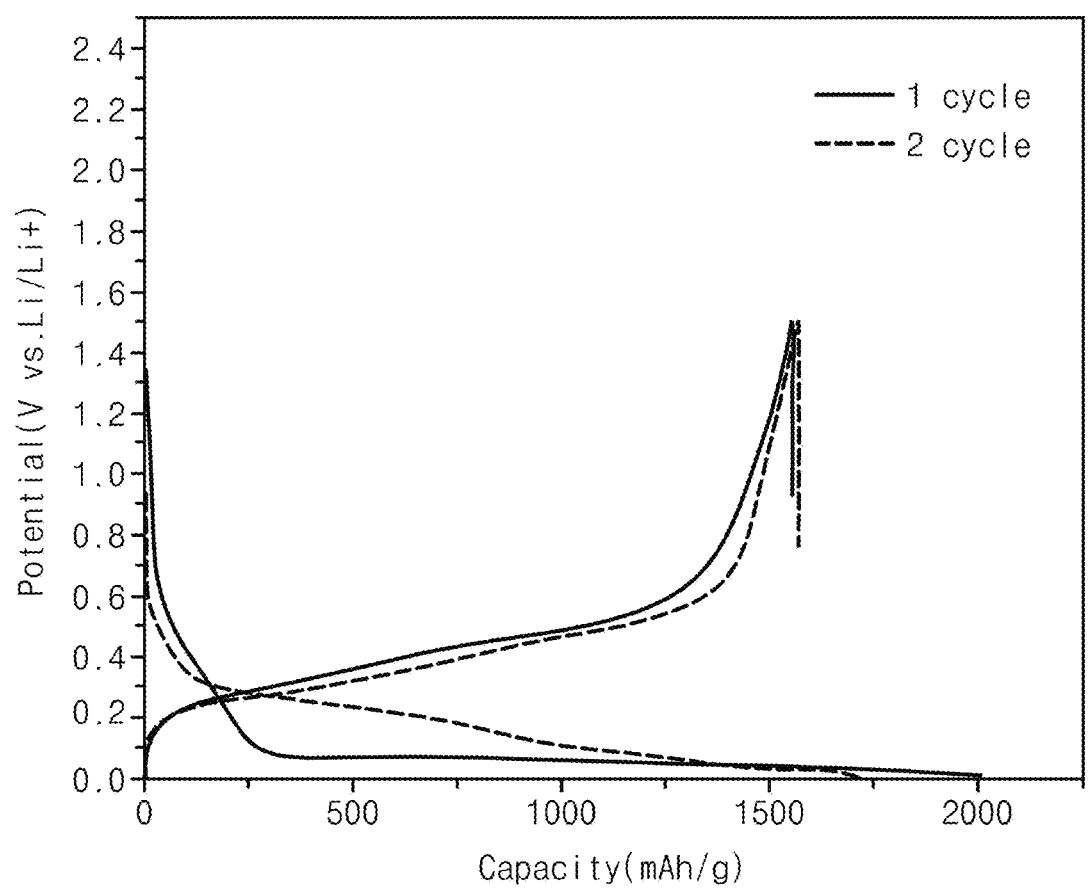
FIGS. 7, 8, and 9 are graphs analyzing electrochemical performance results of lithium secondary batteries manufactured according to Example and Comparative Examples of the inventive concept.
Figure 8:
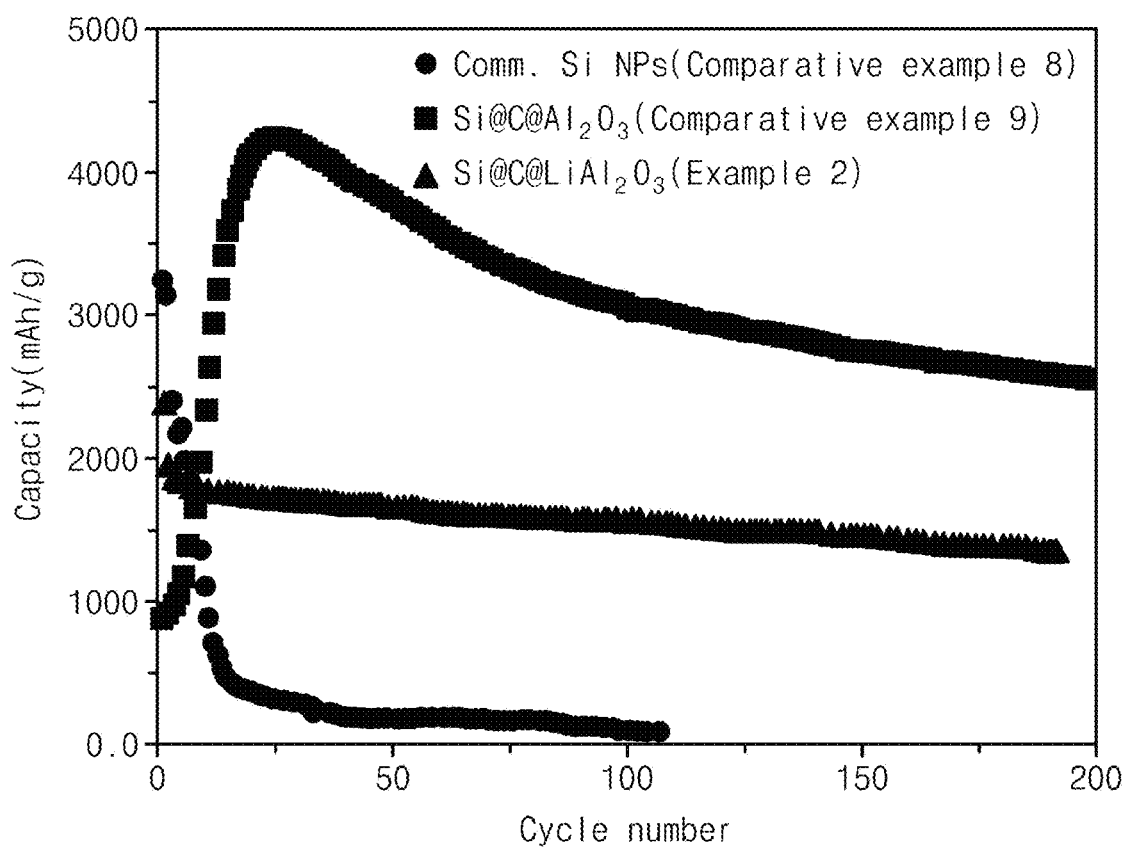
Figure 9:
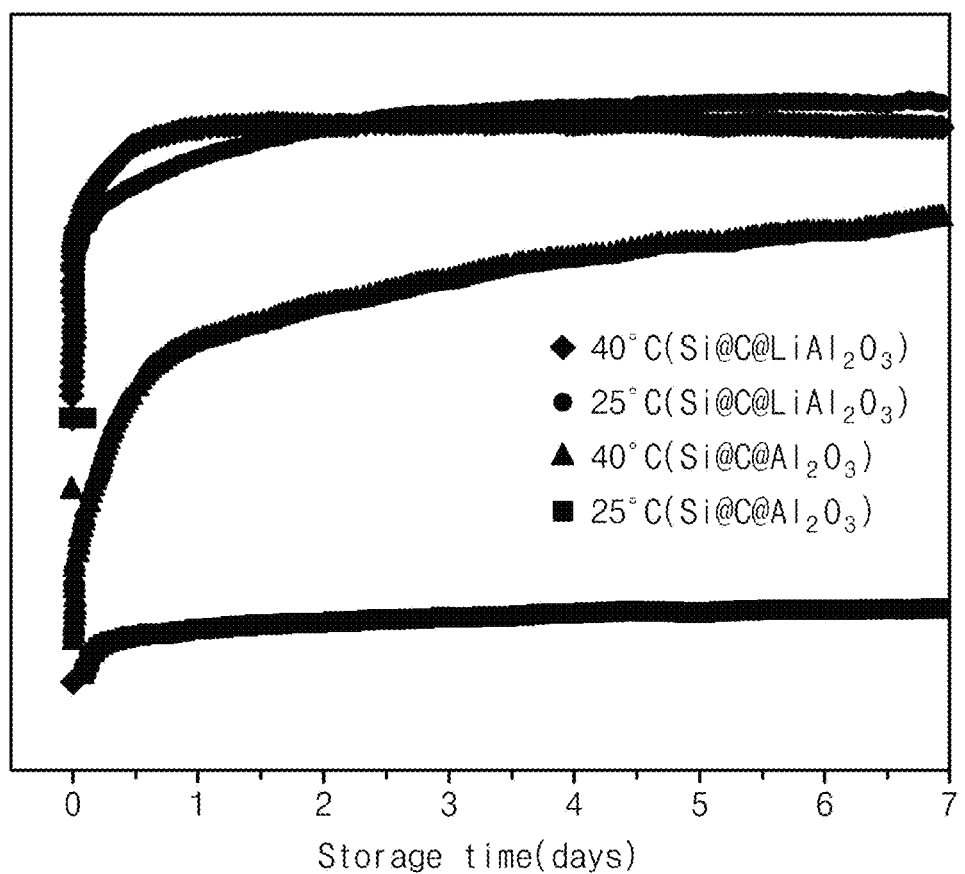

FIGS. 7, 8, and 9 are graphs analyzing electrochemical performance results of lithium secondary batteries manufactured according to Example and Comparative Examples of the inventive concept.

As shown in FIG. 7, a stable cycle performance is able to be observed during two charging/discharging cycles in Example 2. In addition, it was identified that Example 2 exhibits reversible charging/discharging characteristics and has excellent stability.

Referring to FIG. 8, in a case of the SiC structure (Comparative Example 8), an initial discharging capacity was about 3000 mAh/g, and a discharging capacity at a 15th cycle was greatly reduced to about 500 mAh/g, and was continued to be reduced during 100 or more cycles.

It is determined that the unstable SEI is formed in the discharging process, and an irreversible alloy reaction of the silicon particles causes a decrease in the discharging capacity.

In a case of the multi-layer composite structure containing the metal oxide (Comparative Example 9), the initial discharging capacity was very low at about 1000 mAh/g, and the discharging capacity rapidly increased to about 4000 mAh/g after a 25th cycle and then gradually decreased during 200 cycles.

Such rapid increase in the initial discharging capacity of Comparative Example 9 is because an activation process (e.g., Li3.4Al2O3 formation) of the lithium oxide proceeds as the aluminum oxide reacts with the lithium ions. In addition, it is considered that the discharging capacity decreases as the activation process of the lithium oxide causes an unstable lithium extraction phenomenon to allow the lithium ions to escape during the charging process.

Accordingly, it was identified that 50 or more cycles should be performed in Comparative Example 9 until the discharging capacity is stabilized.

In addition, as shown in FIG. 8, in a case of the multi-layer composite structure containing the pre-lithiated metal oxide (Example 2), the initial discharging capacity was 2000 mAh/g, and the stable cycle performance in which the discharging capacity is maintained was observed during 30 cycles. It is determined that a slight decrease in the discharging capacity at the beginning of the charging/discharging cycle was due to uniform insertion and extraction of the lithium ions as a stable lithium-aluminum-oxygen phase contained in the pre-lithiated aluminum oxide suppressed the lithium ion trapping during the charging/discharging process.

That is, it may be seen that the discharging capacity was stabilized in a very short time in the multi-layer composite structure containing the pre-lithiated metal oxide (Example 2).

Referring to FIG. 9, self-discharge characteristics based on a change in an external temperature may be identified using the lithium secondary batteries of Example 2 and Comparative Example 9. Specifically, in a case of Example 9, it may be seen that a very large change in voltage occurred at the external temperature of 25° C. and the external temperature of 40° C. This means that a difference in the self-discharge characteristics based on the temperature change is very large.

On the other hand, in a case of Example 2, there is little change in the voltage at the external temperature of 25° C. and the external temperature of 40° C. This may mean that Example 2 has self-discharge stability based on the temperature change.

Thus, as described above, it was identified that the pre-lithiated metal oxide is able to increase an overall electrochemical performance of the lithium secondary battery by preventing the lithium trapping phenomenon of the lithium secondary battery by inhibiting the irreversible reaction in which the lithium ions and the oxygen ions react to form the lithium oxide, and suppressing the lowering of the insertion speed of the lithium ions occurred during the insertion of the lithium ions into the pre-lithiated metal oxide in the charging and discharging process.

<Experimental Example 5> Volume Expansion Evaluation of Multi-Layer Composite Structure (Si@C@LiAl2O3) Contained in Lithium Secondary Battery Manufactured Through Example 2

Figure 10:
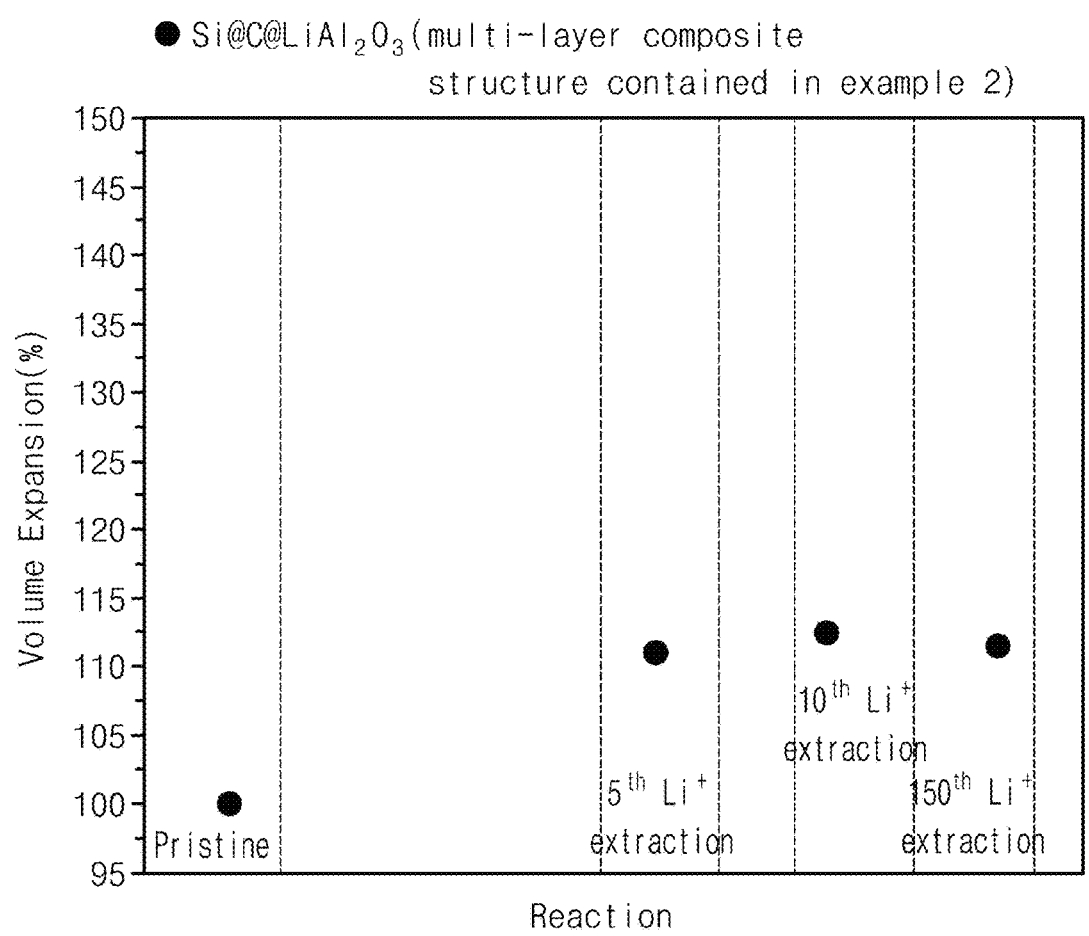
FIG. 10 is a graph analyzing a change in volume of a multi-layer composite structure containing a pre-lithiated metal oxide after a charging and discharging test of a lithium secondary battery manufactured according to Example of the inventive concept.

For evaluation of volume expansion of the lithium secondary battery including the negative electrode using the multi-layer composite structure according to the inventive concept, after the charging/discharging test of the lithium secondary battery manufactured through Example 2 was performed, a volume change of the multi-layer composite structure containing the pre-lithiated metal oxide (Si@C@LiAl$_2$O$_3$) was identified. The identification result is shown in FIG. 10. The charging/discharging test was performed in the voltage range from 0 to 1.2 V, and the charging/discharging cycle was repeated 5 times, 10 times, and 150 times.

FIG. 10 is a graph analyzing a change in volume of a multi-layer composite structure containing a pre-lithiated metal oxide after a charging and discharging test of a lithium secondary battery manufactured according to Example of the inventive concept.

As shown in FIG. 10, the multi-layer composite structure (Si@C@LiAl$_2$O$_3$) contained in Example 2 showed stable volume expansion during 15 charging/discharging cycles.

Specifically, during the charging/discharging cycle, as the silicon particles accommodate more lithium ions in the general insertion process of the lithium ions, expansion of the silicon particles may be caused.

In addition, the extraction process of the lithium ions progresses very slowly because of structural sensitivity of the silicon particles or instability like a decrease in lithium ion conductivity resulted by the SEI that is formed during the charging and the discharging, and is accumulated on the surface over time.

Accordingly, a general change in volume of the silicon particles may occur up to 300% as the charging/discharging cycle proceeds.

In one example, the multi-layer composite structure (Si@C@LiAl$_2$O$_3$) according to Example of the inventive concept contains the silicon particles, the conductive carbon material, and the lithium aluminum oxide, which is the pre-lithiated aluminum oxide. The lithium aluminum oxide may provide thermally and chemically stable properties such that a structure of the silicon particle may be maintained during the charging/discharging cycle.

In addition, the lithium aluminum oxide prevents the thick and unstable SEI from being formed on the surface of the silicon particle, and induces the lithium ions to be uniformly accommodated in the insertion process of the lithium ions.

In addition, the lithium aluminum oxide reacts with the lithium ions in the extraction process of the lithium ions to form a lithium-aluminum-oxygen bridge (Li—Al—O bridge). Accordingly, it is possible to prevent the lithium ion trapping effect that causes a large volume change of the silicon particles by promoting diffusion of the lithium ions into and out of the silicon particles.

That is, as shown in FIG. 10, it may be seen that, in the multi-layer composite structure (Si@C@LiAl$_2$O$_3$) according to Example of the inventive concept, the change in volume was minimized and the volume was expanded stably even after 150 charging/discharging cycles are performed.

Figure 11:
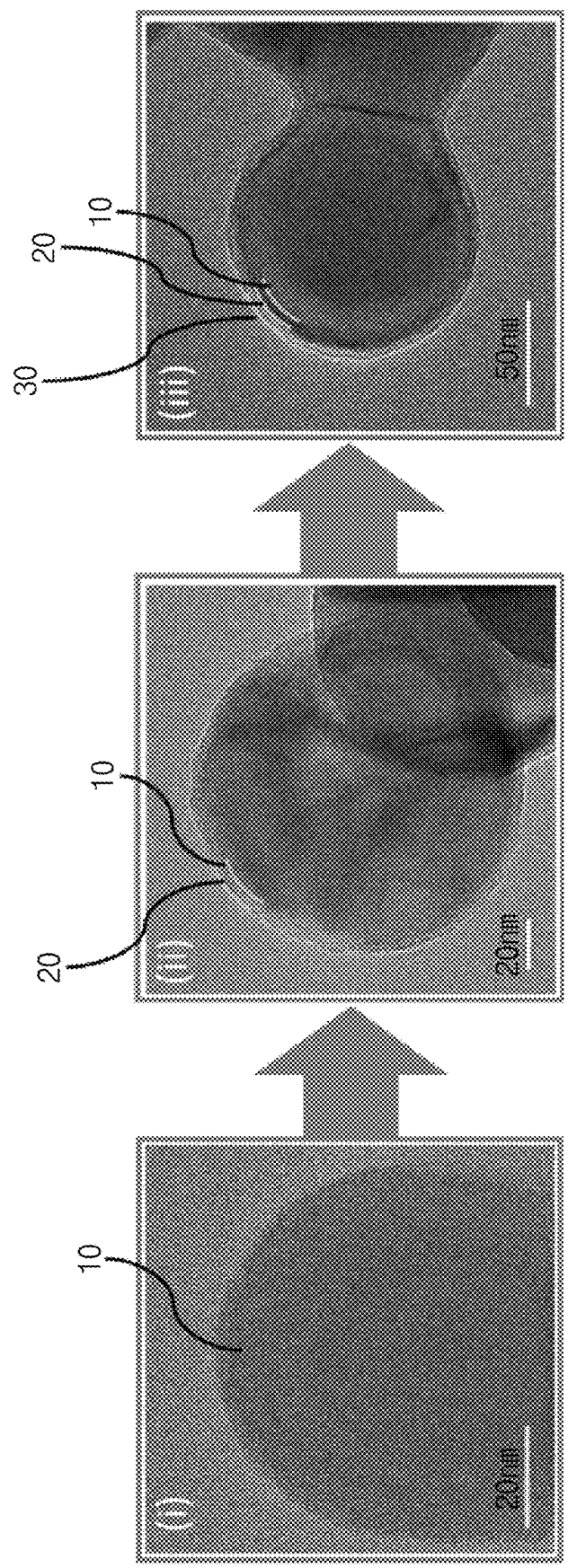
FIG. 11 shows HRTEM images obtained as carbon surface coating and Al2O3 coating are sequentially performed on a silicon nanoparticle in an embodiment of the inventive concept.

FIG. 11 shows HRTEM images obtained as carbon surface coating and Al2O3 coating are sequentially performed on a silicon nanoparticle in an embodiment of the inventive concept.

As shown in FIG. 11, it was identified that the first coating layer 20 was formed on the negative electrode particle 10 corresponding to the silicon nanoparticle through the carbon surface coating, and the second coating layer 30 corresponding to the Al2O3 coating layer was uniformly formed by the first coating layer 20.

Figure 12:
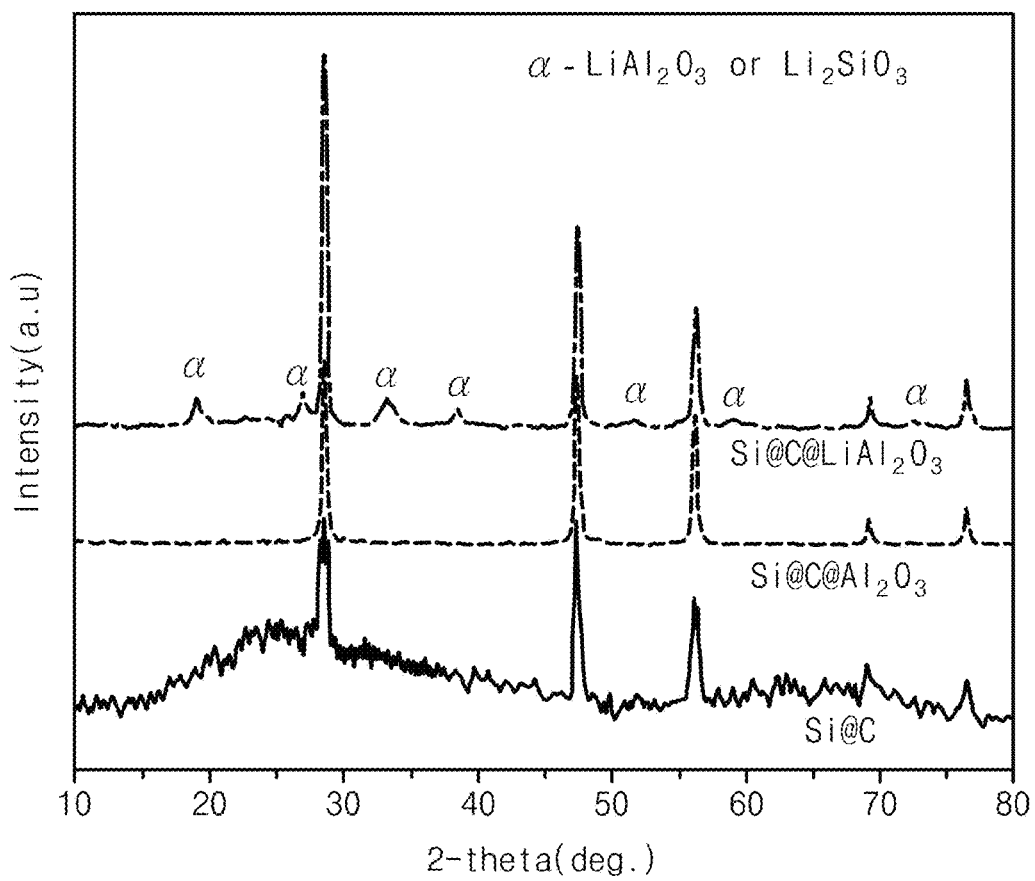
FIG. 12 is a graph showing XRD measurement results of respective composites as a carbon coating step, an Al2O3 coating step, and a pre-lithiation step are performed on a silicon nanoparticle according to an embodiment of the inventive concept.

FIG. 12 is a graph showing XRD measurement results of respective composites as a carbon coating step, an Al2O3 coating step, and a pre-lithiation step are performed on a silicon nanoparticle according to an embodiment of the inventive concept.

As shown in FIG. 12, it was identified that the Si@C (the silicon nanoparticle that is subjected to the carbon surface coating) generated by the carbon coating step and the Si@C@Al2O3 (the silicon nanoparticle that is subjected to the carbon-Al2O3 surface coating) generated by the Al2O3 coating step showed Si (silicon) crystal peaks.

However, after the pre-lithiation step (the Si@C@LiAl2O3), a peak corresponding to a LiAl2O3 or Li2SiO3 phase appeared. This shows that lithiation of the composite was performed well.

Figure 13:
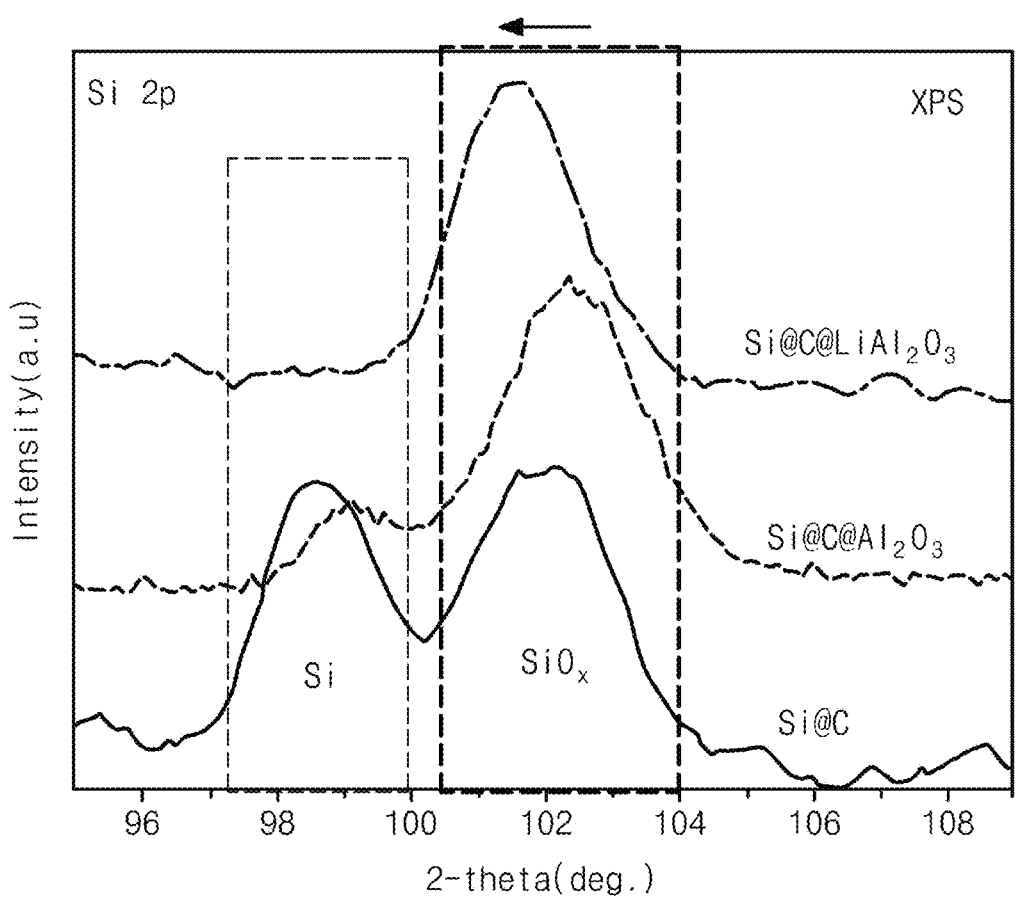
FIG. 13 is a graph showing XPS Si 2p spectrum measurement results of respective composites as a carbon coating step, an Al2O3 coating step, and a pre-lithiation step are performed on a silicon nanoparticle according to an embodiment of the inventive concept.

FIG. 13 is a graph showing XPS Si 2p spectrum measurement results of respective composites as a carbon coating step, an Al2O3 coating step, and a pre-lithiation step are performed on a silicon nanoparticle according to an embodiment of the inventive concept.

As shown in FIG. 13, the Si@C (the silicon nanoparticle that is subjected to the carbon surface coating) generated by the carbon coating step showed peaks at 99.5 eV and 103 eV, which respectively correspond to Si and SiOx. After the Al2O3 coating step (the Si@C@Al2O3), the peak at 99.5 eV was greatly reduced, because an intensity of photoelectrons emitted from a core-level orbital of Si decreased. After the pre-lithiation step (the Si@C@LiAl2O3), one peak at 101 eV existed, which indicates formation of lithiated SiOx (lithium silicate).

Figure 14:
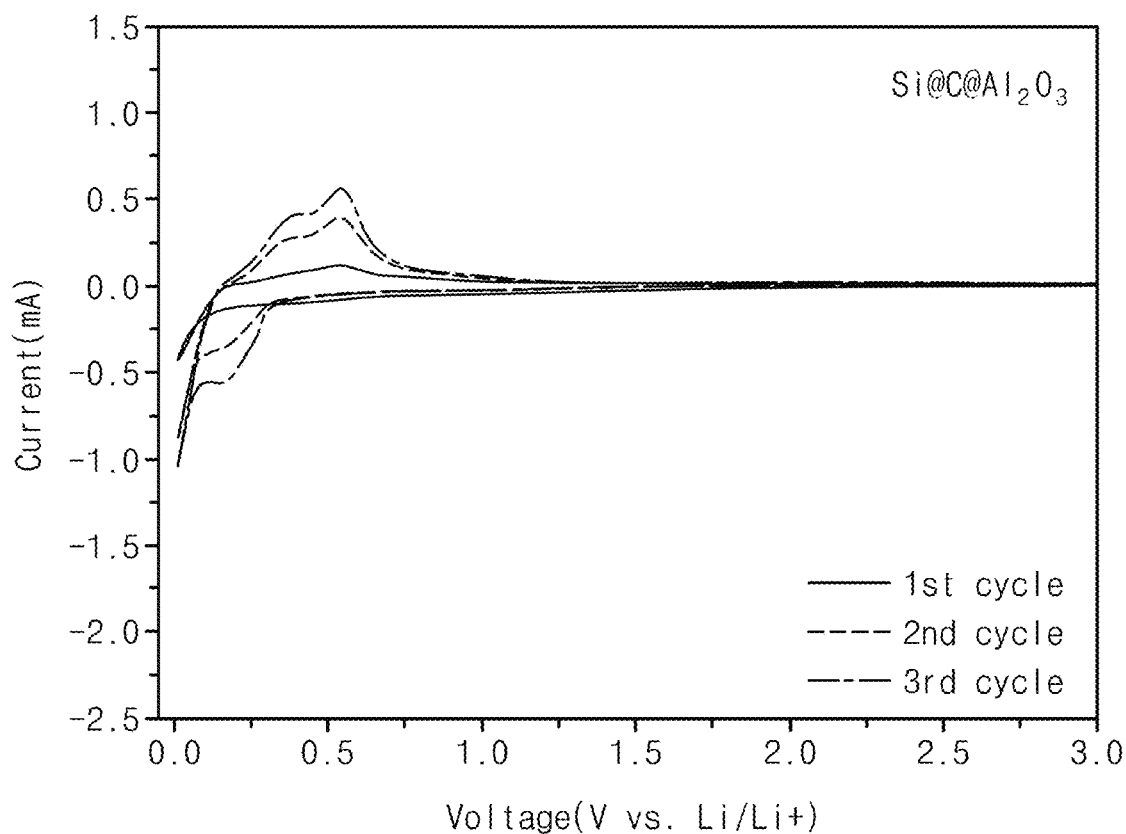
FIG. 14 is a graph showing a cyclic voltammetry measurement result of Si@C@Al2O3 before a pre-lithiation step.

FIG. 14 is a graph showing a cyclic voltammetry measurement result of Si@C@Al2O3 before a pre-lithiation step.

Figure 15:
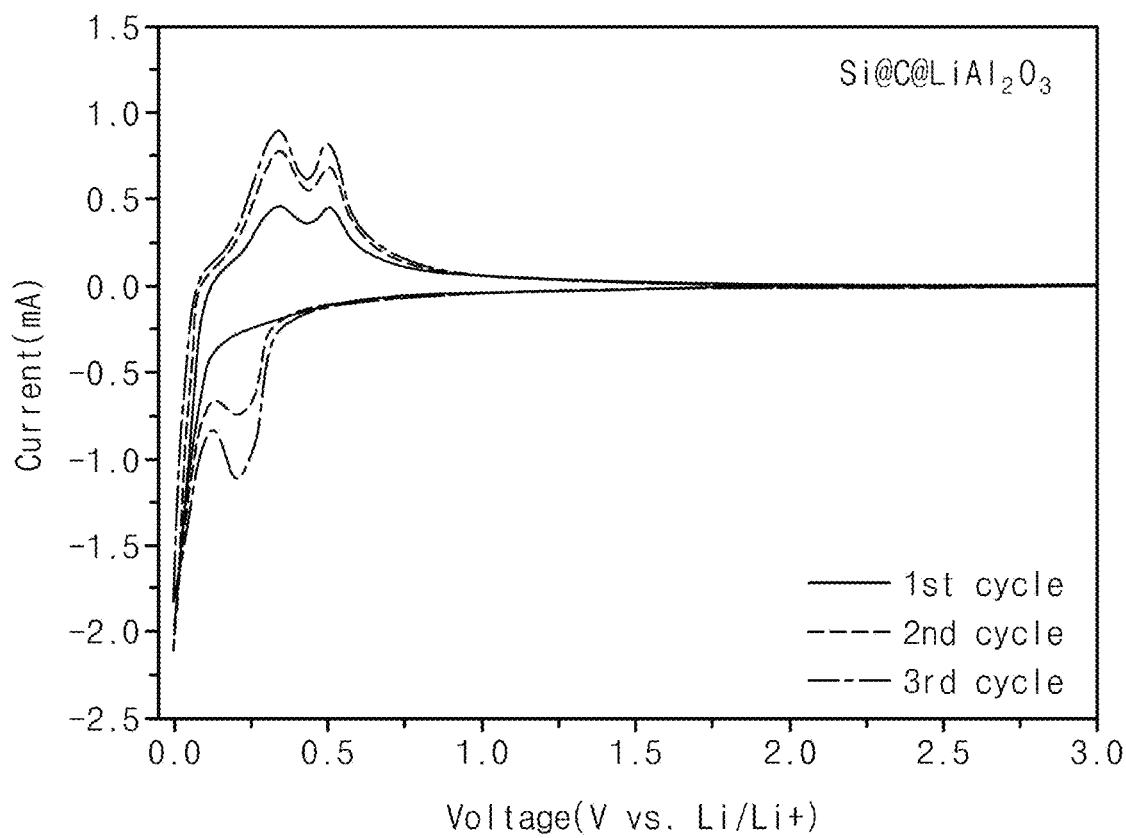
FIG. 15 is a graph showing a cyclic voltammetry measurement result of Si@C@LiAl2O3 after a pre-lithiation step.

FIG. 15 is a graph showing a cyclic voltammetry measurement result of Si@C@Al2O3 after a pre-lithiation step.

As shown in FIGS. 14 and 15, a peak at 0.2 V appeared during the discharging process. This indicates formation of a Li—Si amorphous phase (a-LixSi) through an alloying reaction between lithium and silicon. In particular, a pre-lithiated sample (the Si@C@LiAl2O3) showed a larger peak, which means that the lithiation reaction of the complex occurred more effectively.

In addition, during the charging process, peaks at 0.32 V and 0.49 V corresponding to a de-lithiation reaction appeared. This indicates that the de-lithiation reaction may be actively performed by greatly reducing the lithium ion trapping (Li ion trapping) of the silicon composite through the pre-lithiation.

Thus, in the charging and discharging process, the pre-lithiated metal oxide may serve as the artificial SEI to induce the formation of the stable SEI, thereby allowing the insertion and the extraction of the lithium ions to be performed smoothly to effectively solve the lithium trapping problem of the silicon negative electrode.

In addition, the inventive concept may effectively reduce the above-described lithium trapping problem, thereby preparing a multi-layer composite structure containing a pre-lithiated metal oxide that achieve excellent initial coulombic efficiency of about 82%.

In addition, the above-mentioned content is to describe a preferred embodiment of the inventive concept, and the inventive concept is able to be used in various other combinations, modifications, and environments. That is, changes or modifications are possible within the scope of the concept of the invention disclosed herein, the scope equivalent to the written disclosure, and/or within the scope of skill or knowledge in the art. The written embodiment is to describe the best state for implementing the technical idea of the inventive concept, and various changes thereof required in specific application fields and uses of the inventive concept are also possible. Therefore, the above detailed description of the invention is not intended to limit the inventive concept to the disclosed embodiment. The appended claims should also be construed to include other embodiments as well.

The multi-layer composite structure containing the pre-lithiated metal oxide and the method for preparing the same may use the eco-friendly process and reduce the lithium ion trapping phenomenon that occurs as the result of the incomplete de-lithiation, thereby preventing the acceleration of the capacity fading speed of the lithium secondary battery resulted from the structural fading effect during the charging/discharging cycle.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for preparing a core/multi-layer shell composite structure for a lithium secondary battery, the method comprising:
    a first step of mixing negative electrode particles with a buffer solution containing dopamine to prepare a first particle mixture with a first layer of a polydopamine coating layer on the negative electrode particles as a core;
    a second step of dispersing the first particle mixture in a metal precursor aqueous solution to prepare a second particle mixture with a second layer of a metal oxide coating layer comprising a pre-lithiated metal oxide formed through a lithiation reaction on the first layer of the polydopamine coating layer; and
    a third step of pre-lithiating the second particle mixture by mixing the second particle mixture with a lithium precursor and then heat-treating the second particle mixture,
    wherein the negative electrode particles are at least one selected from a group consisting of silicon, silicon oxide, silicon carbide, silicon metal alloy, and combinations of silicon, silicon oxide, silicon carbide, and silicon metal alloy, and the pre-lithiated metal oxide is selected from a group consisting of a lithium aluminum oxide ($LiAl_2O_3$), a lithium magnesium oxide (LiMgO), and a lithium zinc oxide (LiZnO).

2. The method of claim 1, wherein the first step includes:
   a step of stirring the negative electrode particles and dopamine hydrochloride in distilled water to form a stirred mixture; and
   a step of polymerizing the dopamine on the negative electrode particles by adding a tris-HCl buffer solution to the stirred mixture.

3. The method of claim 2, wherein the second step includes:
   a step of preparing the metal precursor aqueous solution;
   a step of dispersing and stirring the first particle mixture in the prepared metal precursor aqueous solution; and
   a step of performing a wet synthesis treatment including hydrothermal synthesis, solvothermal synthesis, and sol-gel synthesis on the stirred aqueous solution.

4. The method of claim 3, wherein, in the third step, through the heat treatment, the polydopamine coating layer is carbonized to form a conductive carbon material, and the metal oxide coating layer forms a pre-lithiated metal oxide as a chemical bonding reaction with the lithium precursor is induced.

5. The method of claim 4, wherein the metal precursor aqueous solution contains a metal precursor, distilled water, and urea,
   wherein the metal precursor is at least one precursor compound for a metal material selected from a group consisting of aluminum, titanium, and manganese,
   wherein the precursor compound is selected from a group consisting of a salt, an organic-inorganic compound, and an oxide.

6. The method of claim 5, wherein the sol-gel synthesis is performed by heating the stirred aqueous solution at a temperature in a range from 70 to 90° C. for 4 hours, and then, increasing the heating temperature to 120° C. to completely evaporate a solvent.

7. The method of claim 6, wherein the lithium precursor is one material selected from a group consisting of lithium acetate ($C_2H_3LiO_2$), lithium hydroxide (LiOH), lithium nitrate ($LiNO_3$), and lithium chloride (LiCl).

* * * * *